United States Patent
Mizutani et al.

[11] Patent Number: 6,074,782
[45] Date of Patent: Jun. 13, 2000

[54] LEAD STORAGE BATTERY CONTAINING A NEGATIVE ELECTRODE ACTIVE SUBSTANCE INCLUDING A NEGATIVE ELECTRODE ADDITIVE

[75] Inventors: Muneharu Mizutani, Toyohashi; Katsumi Yamada, Nishio; Takaki Kamio, Kariya; Masanobu Kawamura, Iwakuni, all of Japan

[73] Assignees: Aisin Seiki Kabushiki Kaisha, Kariya; Nippon Paper Industries Co., Ltd., Tokyo, both of Japan

[21] Appl. No.: 08/952,510

[22] PCT Filed: Mar. 27, 1997

[86] PCT No.: PCT/JP97/01066

§ 371 Date: Dec. 23, 1997

§ 102(e) Date: Dec. 23, 1997

[87] PCT Pub. No.: WO97/37393

PCT Pub. Date: Oct. 9, 1997

[30]    Foreign Application Priority Data

Mar. 29, 1996 [JP] Japan ................................. 8-103757

[51] Int. Cl.[7] ........................................................ H01M 4/60
[52] U.S. Cl. ............................................. 429/215; 429/227
[58] Field of Search ...................................... 429/215, 227

[56]    References Cited

FOREIGN PATENT DOCUMENTS 2-234352  9/1990  Japan.
7-90193   4/1995  Japan.
8-245899  9/1996  Japan.

OTHER PUBLICATIONS

GS News, vol. 37, No. 1, pp. 22–28, 1978. Effect of Lignin Additive in Negative Electrode for Lead–Acid Battery.

*Primary Examiner*—Maria Nuzzolillo
*Assistant Examiner*—Laura Weiner
*Attorney, Agent, or Firm*—Oblon, Spivak, McClelland, Maier & Neustadt, P.C.

[57]    ABSTRACT

A lead storage battery comprising a positive electrode 11 and a negative electrode 12. The negative electrode 12 contains a negative electrode active substance to which a negative electrode additive is added. The negative electrode additive is a phenol·aminobenzene sulfonic acid·formaldehyde condensate. The above-structured lead storage battery provides a prolonged cycle life and excellent charging performance.

11 Claims, 6 Drawing Sheets

LEAD STORAGE BATTERY CONTAINING A NEGATIVE ELECTRODE ACTIVE SUBSTANCE INCLUDING A NEGATIVE ELECTRODE ADDITIVE

TECHNICAL FIELD

The present invention relates to a lead storage battery using a negative electrode active substance that contains an added negative electrode additive.

PRIOR ART

A lead storage battery is generally formed of a positive electrode, a negative electrode and electrolyte. Conventionally the negative electrode of the above-formed lead storage battery uses the negative electrode active substance that contains the negative electrode additive that has been added thereto. The substance called lignin is used as the negative electrode additive.

The lignin has provided advantages such as inhibiting the negative electrode from decreasing its surface area or shrinking, keeping charging/discharging reactivity and further prolonging the cycle life of the lead storage battery.

The lignin serves to supply a $Pb^{2+}$ ion during charging/discharging so that the discharging performance of the lead storage battery is enhanced especially at a low temperature.

However as the lignin is characterized to be decomposed in the process of repetitive charging/discharging of the lead storage battery, the organic substance generated by the decomposition may elute into the electrolyte. In such a case, the excessive voltage of the lead storage battery is raised, resulting in degraded charging performance (GS-News, Vol. 37, No. 1, pp.22–28, 1978).

In order to solve the aforementioned problem, the present invention provides the lead storage battery having a prolonged cycle life and excellent charging performance.

DISCLOSURE OF THE INVENTION

The first aspect of the present invention is characterized by a lead storage battery comprising a positive electrode and a negative electrode. The negative electrode contains a negative electrode active substance to which a negative electrode additive is added. The negative electrode additive is a phenol·aminobenzene sulfonic acid·formaldehyde condensate.

The effect of the present invention is hereinafter described.

The lead storage battery of the present invention uses a synthetic polymeric product, i.e., phenol·aminobenzene sulfonic acid·formaldehyde condensate exhibiting the similar structure to that of the lignin that has been conventionally used and replaced thereby, as the negative electrode additive.

The above phenol·aminobenzene sulfonic acid·formaldehyde condensate serves to inhibit the negative electrode from decreasing its surface area and shrinking. Therefore the charging/discharging reactivity can be remained. The cycle life of the lead storage battery can be prolonged and the charging performance thereof can be enhanced.

The present invention provides the lead storage battery presenting 2 to 3 times higher charging performance compared with that of the conventional lead storage battery using the lignin as the negative electrode additive. The cycle life of the lead storage battery of the present invention is similar to that of the conventional lead storage battery.

The lignin as the conventional negative electrode additive is a natural product belonging to the group of phenol polymer that has the structure formed by combining a plurality of unit structures in a complex manner. The lignin has the portion that is likely to be oxidized/deoxidized, i.e., carbonyl group and the like. This portion is oxidized or deoxidized accompanied with charging/discharging of the lead storage battery. As a result, the lignin is decomposed.

The phenol·aminobenzene sulfonic acid·formaldehyde condensate of the present invention is the phenol polymer having the same water solubility as that of the lignin. However unlike the lignin, this substance is a synthetic product as the polymer in which specific unit structures are sequentially combined having no portion susceptible to be oxidized/deoxidized such as the carbonyl group of the lignin.

As a result, the above phenol·aminobenzene sulfonic acid·formaldehyde condensate is hardly decomposed compared with the lignin in the process of charging/discharging of the lead storage battery.

Accordingly the organic substance is inhibited from eluting into the electrolyte, thus preventing deterioration of the charging performance.

The present invention provides the lead storage battery that has a prolonged cycle life and excellent charging performance.

The phenol·aminobenzene sulfonic acid- formaldehyde condensate can be easily obtained by mixing 0.2 to 1.8 mole of the aminobenzene sulfonic acid and 0.5 to 3.0 mole of the formaldehyde to 1 mole of the phenol skeleton under an aqueous condition at an increased temperature for condensation polymerization.

As the phenol·aminobenzene sulfonic acid·formaldehyde condensate, a sodium salt, calcium salt of the condensate and the like obtained through neutralization using sodium hydroxide, calcium hydroxide and the like can be used (see FIG. 2).

As described in the second aspect of the present invention, it is preferable that the sulfur content of the phenol·aminobenzene sulfonic acid·formaldehyde condensate ranges from 6 to 11%.

The aforementioned sulfur content is proportional to the hydrophilic level of the phenol·aminobenzene sulfonic acid·formaldehyde condensate (amount of the sulfonic structure) and the content of the aminobenzene sulfonic acid thereof. In case of charging the lead storage battery, the phenol·aminobenzene sulfonic acid·formaldehyde condensate has less amount of the organic substance eluted into the electrolyte compared with the lignin. As the hydrophilic level of the above condensate becomes lower, less amount of the organic substance elutes into the electrolyte.

Therefore it is preferable that the phenol·aminobenzene sulfonic acid·formaldehyde condensate contains the sulfur as least as possible.

When discharging the lead storage battery, the phenol·aminobenzene sulfonic acid·formaldehyde condensate decomposes (desorbs) and a small amount of aminobenzene sulfonic acid elutes into the electrolyte. The desorbed aminobenzene sulfonic acid contributes improved discharging performance.

Therefore in the above aspect, it is preferable that the phenol·aminobenzene sulfonic acid·formaldehyde condensate contains sulfur as much as possible.

Consequently the present invention provides the lead storage battery exhibiting excellent charging/discharging performances.

If the sulfur content is 6% or less, the discharging performance of the lead storage battery might be degraded. While if the sulfur content exceeds 11%, the charging performance of the lead storage battery might be degraded.

The sulfur content is expressed as the weight ratio of the solid sulfur part to the solid part of the phenol·aminobenzene sulfonic acid·formaldehyde condensate. The sulfur content can be easily measured by the ICP (Ion Sequential Plasma) method or the like.

As described in the third aspect of the invention, it is preferable that the phenol·aminobenzene sulfonic acid·formaldehyde condensate is the bisphenol·aminobenzene sulfonic acid·formaldehyde condensate.

According to JP 1910968 and U.S. Pat. No. 5,153,299, the condensate using bisphenol as a 2-ring phenol serves to decrease a large amount of the low molecular weight part such as the unreacted monomer or the like compared with the condensate using a single ring phenol. The low molecular weight part, i.e., the unreacted monomer, exhibits high hydrophilicity and is likely to elute into the electrolyte. Accordingly employing the condensate using the bisphenol as the negative electrode additive may further prevent elution of the organic substance into the electrolyte.

In addition to the bisphenol A (dihydroxydiphenylpropane) specified in the fourth aspect of the present invention, bisphenol F (dihydroxydiphenylmethane), bisphenol S (dihydroxydiphenylsulfon), a phenol equivalent to the monomer of the bisphenol A and bisphenol F, lower alkylphenol and the like can be used as the aforementioned phenol.

According to the fourth aspect of the present invention, it is preferable that the bisphenol A·aminobenzene sulfonic acid·formaldehyde condensate is used as the phenol·aminobenzene sulfonic acid·formaldehyde condensate so that elution of the organic substance into the electrolyte is further prevented. As the production cost of the bisphenol A that can be mass produced is the lowest among those of other types of bisphenol, it is practically the most reasonable to use the bisphenol A·aminobenzene sulfonic acid·formaldehyde condensate.

As the above condensate, a sodium salt (see FIG. 2) and acid (—$SO_3H$) can be used.

According to the fifth aspect of the present invention, it is preferable to add 0.2 wt. % of the bisphenol A·aminobenzene sulfonic acid·formaldehyde condensate to the negative electrode active substance so that the charging performance is increased.

When the added amount of the bisphenol A·aminobenzene sulfonic acid·formaldehyde condensate is less than 0.2 wt. %, regenerative specific power density especially at a low temperature (see Embodiment described below) is decreased, resulting in degrading the performance of the lead storage battery.

Preferably the upper limit of the added amount of the bisphenol A·aminobenzene sulfonic acid·formaldehyde condensate is set to 10 wt. %. Even when increasing the added amount to exceed the upper limit, the remarkable effect can no longer be obtained. As the bisphenol A·aminobenzene sulfonic acid·formaldehyde condensate is expensive compared with the lignin, the use thereof may result in the cost increase.

In case the lead storage battery is specified to be used in the cold district or at a low temperature on the regular basis, the preferable upper limit of the added amount of the bisphenol A·aminobenzene sulfonic acid- formaldehyde condensate is set to 1.5 wt. %. In case of adding the bisphenol A·aminobenzene sulfonic acid·formaldehyde condensate to exceed this upper limit, the regenerative specific power density might be lowered at a low temperature (see FIG. 6).

According to the sixth aspect of the present invention, it is preferable that the negative electrode active substance contains barium sulfate. The barium sulfate becomes a core for forming the crystal of lead sulfate ($PbSO_4$) generated during discharging, thus functioning to prevent a huge crystal from growing. As a result, discharging capability, charging capability and cycle life of the lead storage battery are improved.

According to the seventh aspect of the present invention, it is preferable to use a sodium salt (see FIG. 2) as the bisphenol A·aminobenzene sulfonic acid·formaldehyde condensate so as to provide further excellent charging performance.

DESCRIPTION OF CODES

1 . . . lead storage battery
11 . . . positive electrode
12 . . . negative electrode
16 . . . electrolyte Description of the Preferred Embodiment Embodiment 1

A lead storage battery and evaluation on its performance of this embodiment according to the present invention are hereinafter described referring to FIG. 1 to FIG. 4.

Figure 2:
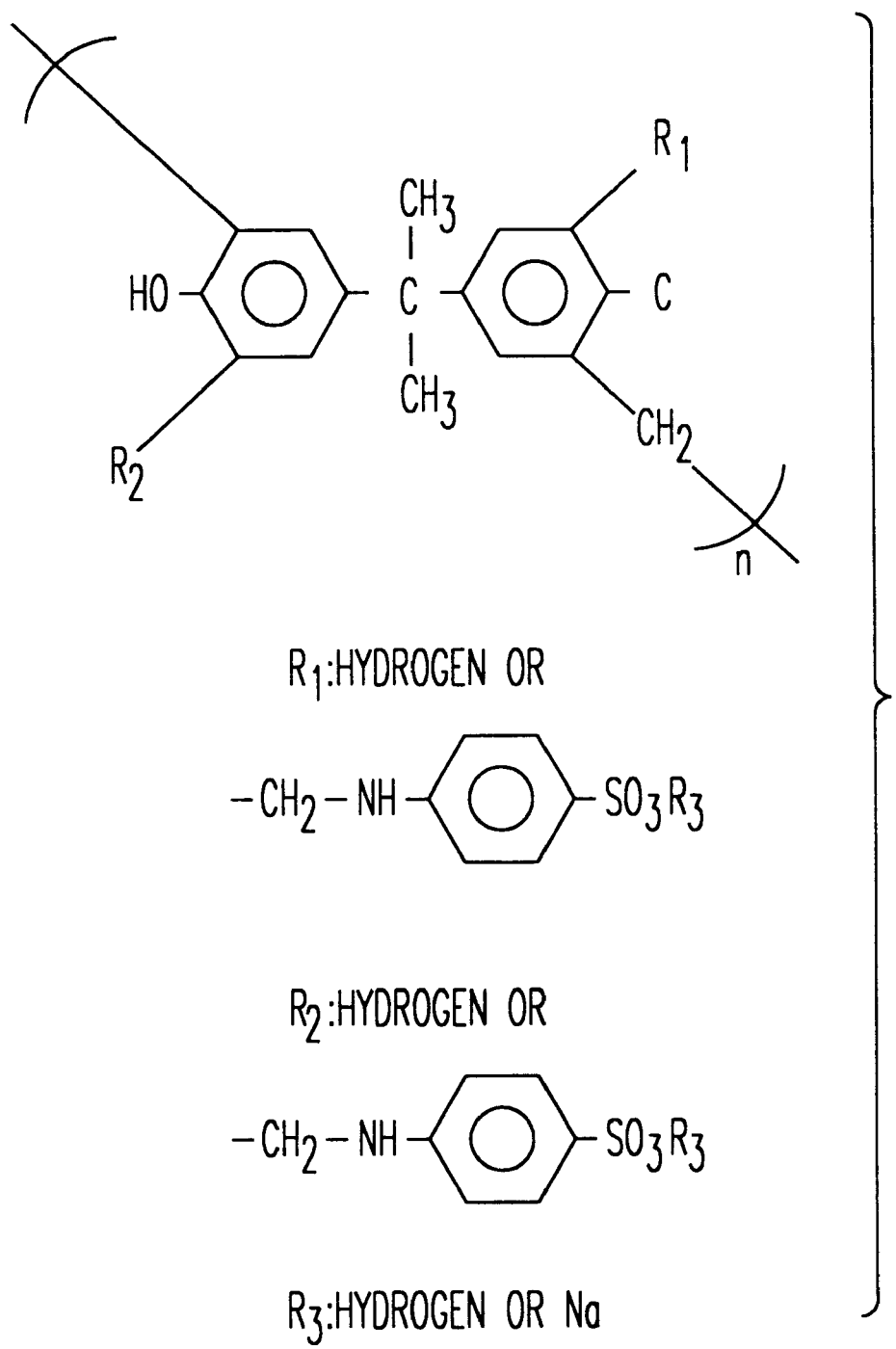
FIG. 2 is an explanatory view showing a bisphenol A·aminobenzene sulfonic acid·formaldehyde condensate of the embodiment 1.

A lead storage battery of this embodiment comprises a positive electrode, a negative electrode and electrolyte. The negative electrode contains a negative electrode active substance to which a negative electrode additive has been added. The negative electrode additive is formed of the bisphenol A·aminobenzene sulfonic acid·formaldehyde condensate (sodium salt) as shown in FIG. 2.

A structure of the above-described lead storage battery is described in detail.

Figure 1:
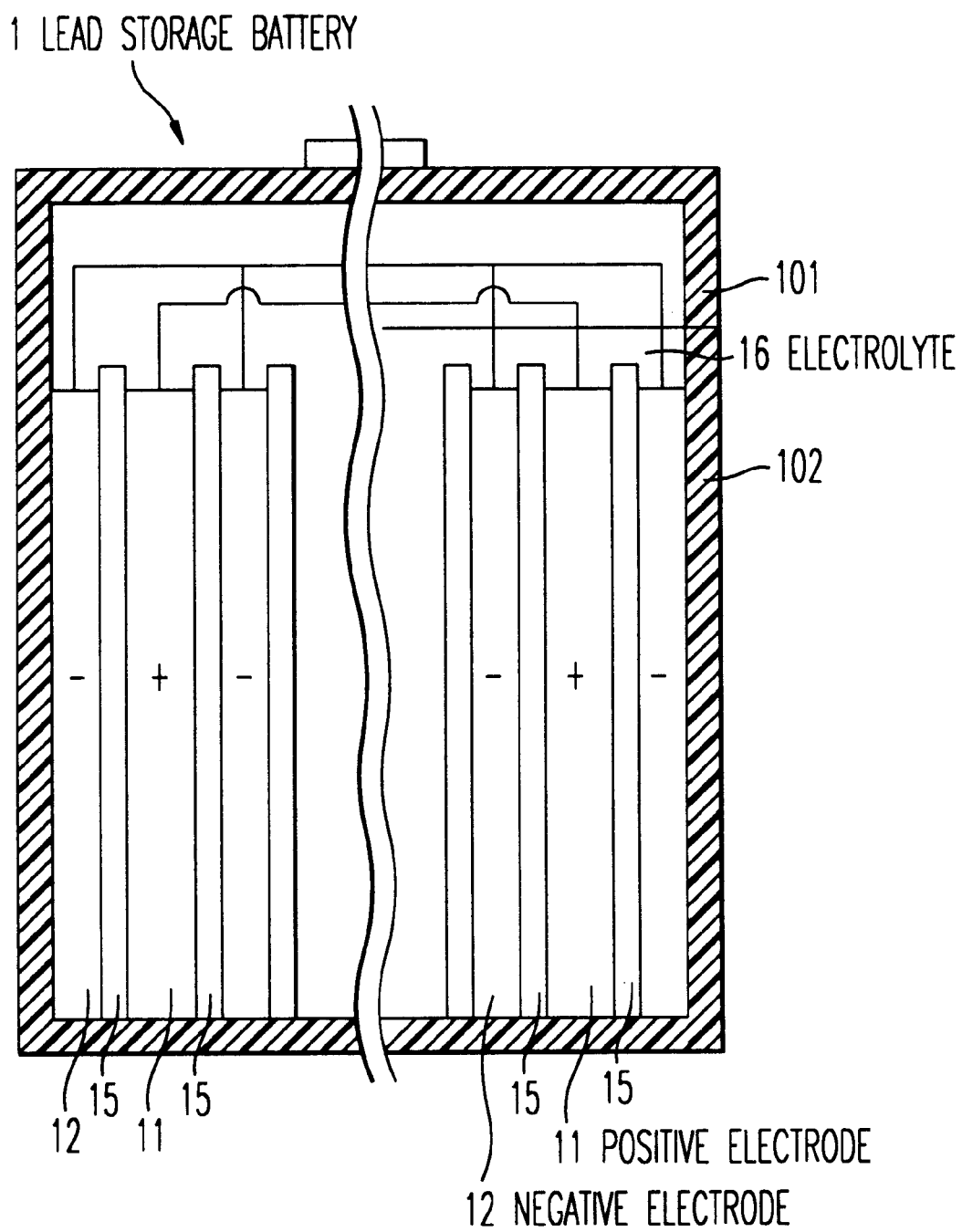
FIG. 1 is a schematic view showing a structure of a lead storage battery of an embodiment 1.

Referring to FIG. 1, the lead storage battery 1 comprises positive electrodes 11 containing lead as the positive electrode active substance, retainers 15 and negative electrodes 12 containing lead oxide as the negative electrode active substance which are arranged in consecutive orders and enclosed in a reservoir having a container 102 and a cover 101. The container 102 is filled with an electrolyte 16, i.e., a water solution of sulfate.

The negative electrode 12 is prepared in the following steps.

First 0.3 wt. % of the bisphenol A·aminobenzene sulfonic acid·formaldehyde condensate (sodium salt; using the product called formaldehyde "VISPERSE P215", hereinafter referred to as VISP, manufactured by NIPPON PAPER INDUSTRIES CO., LTD.) as the negative electrode additive and 0.15 wt. % of barium sulfate were added to 100 wt. % of the porous (sponge-like) lead oxide as the negative electrode active substance to obtain a paste mixture.

The paste mixture was applied to an electrode grating for drying to obtain the negative electrode 12.

The retainer 15 used a non-woven fabric formed from a glass fiber material.

The above-prepared negative electrodes 12, retainers 15 and the positive electrodes 11 were arranged in consecutive orders and enclosed in the container 102 to form the lead storage battery 1 as shown in FIG. 1.

Assuming to define the above-structured lead storage battery shown in FIG. 1 as a cell, a plurality of cells can be connected in series to form a lead storage battery providing a large capacity.

Figure 3:
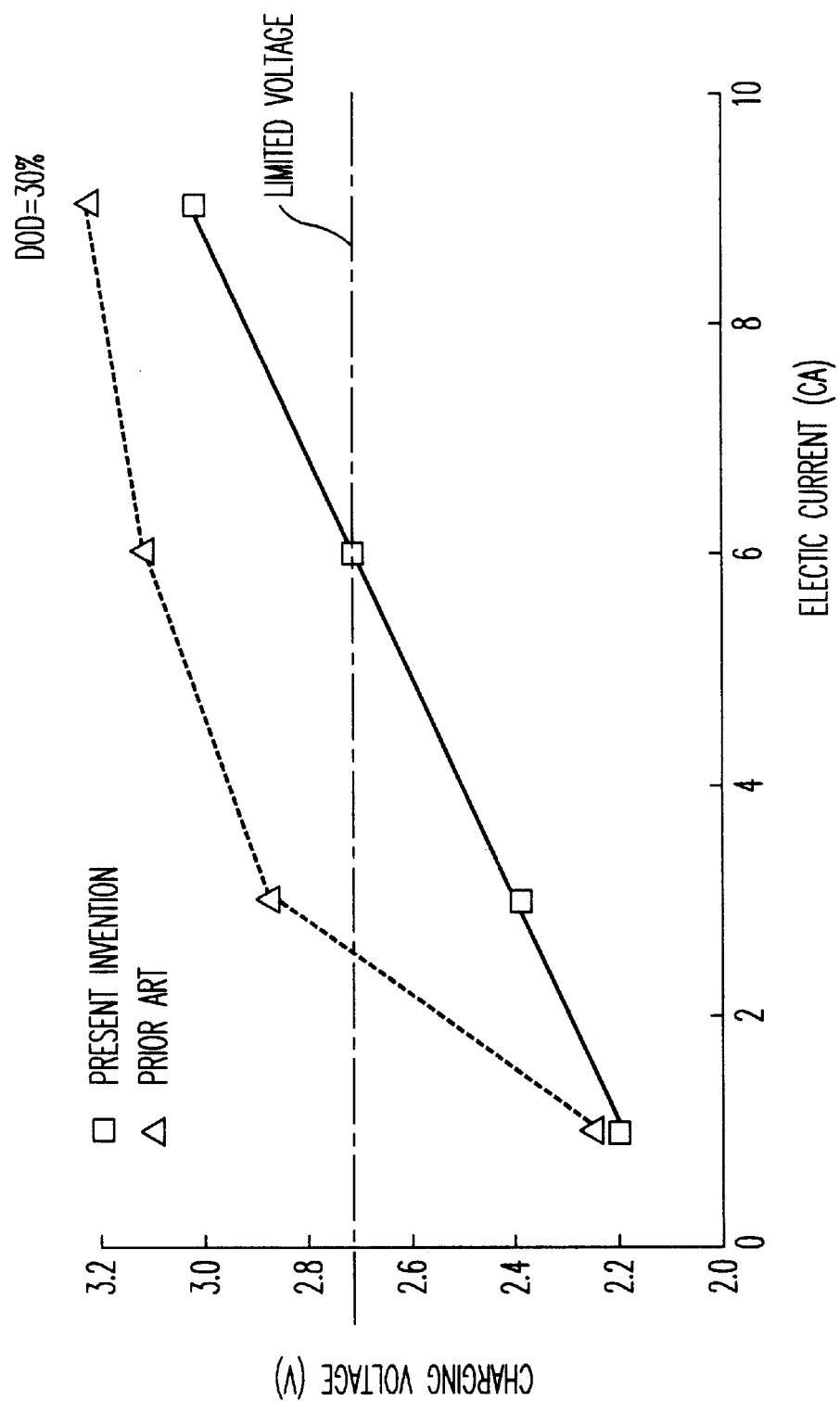
FIG. 3 is a graphical representation showing a relationship between electric current and charging voltage with respect to the present invention and the prior art, respectively under the condition of DOD=30% in an embodiment 2.
Figure 4:
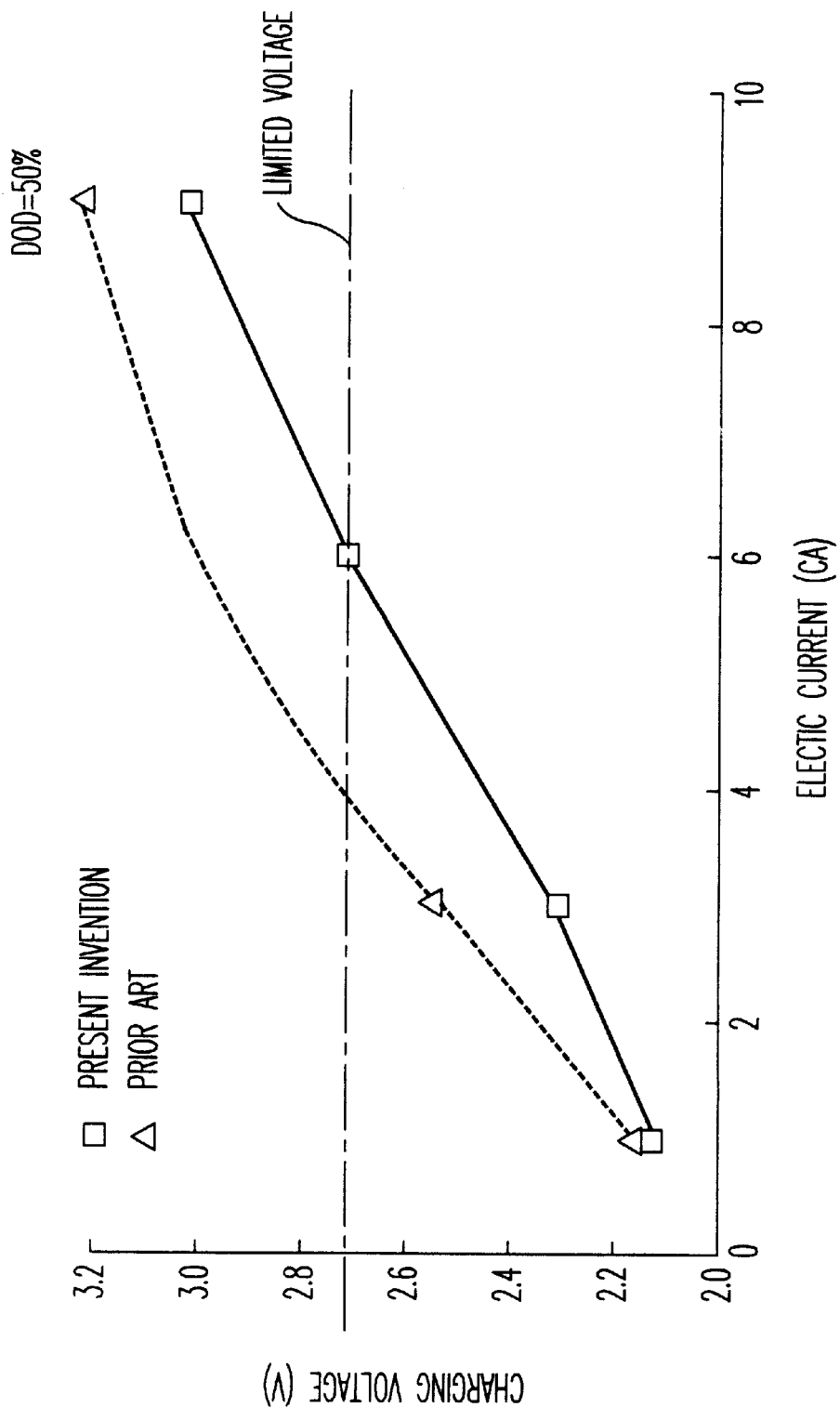
FIG. 4 is a graphical representation showing a relationship between electric current and charging voltage with respect to the present invention and the prior art, respectively under the condition of DOD=50% in the embodiment 2.

Referring to FIGS. 3 and 4, evaluation on the performance of the lead storage battery of the present invention is explained as well as that of the conventional lead storage battery.

The lead storage battery of the present invention was prepared. This lead storage battery comprises the negative electrodes and the positive electrodes as aforementioned. The amount of the negative electrode additive added to the porous lead (the negative electrode active substance) is the same as specified above.

The prior art used the product named Lignin VANILLEX N (manufactured by NIPPON PAPER INDUSTRIES CO., LTD.) as the negative electrode instead of the VISP of the present invention. Other features are the same as those of the lead storage battery of the present invention.

For preparing the negative electrode of the prior art, 0.4 wt. % of lignin and 0.3 wt. % of barium sulfate were added to 100 wt. % of the porous lead oxide as the negative electrode active substance.

The lead storage batteries of the present invention and the prior art were adjusted to set DOD=30% and DOD=50%, respectively. The term "DOD" represents the "Depth of Discharge". The condition DOD=30% represents that 30% of the battery capacity has discharged from full charging. The condition DOD=50% likewise represents that 50% of the capacity has discharged from full charging.

Then each lead storage battery of the present invention and the prior art adjusted to set DOD=30% and DOD=50% was charged, respectively. At this time the electric current was varied in the range from 1 CA to 9 CA. The terminal voltage of the lead storage battery after an elapse of 10 seconds from charging was measured for each case. The term "CA" stands for the "Capacity Ampere", representing the electric current per a unit capacity.

FIG. 3 shows the measurement results under the condition of DOD=30%. FIG. 4 shows the measurement results under the condition of DOD=50%.

In the lead storage battery, when the terminal voltage level at charging exceeds the "limited voltage", electrodialysis occurs in the electrolyte, interfering further charging. Particularly in case such electrodialysis occurs in the lead storage battery of a closed type, charging cannot be done efficiently owing to gas generated therein. The aforementioned phenomenon might cause exhaustion of the electrolyte, thus decreasing the lead storage battery life. Additionally the level of self-discharging becomes relatively high, resulting in decreasing the capacity of the lead storage battery at an earlier stage.

In order to avoid the aforementioned problems, the terminal voltage at charging has to be kept lower than the "limited voltage".

Referring to FIG. 3, in the present invention, the electric current at a time point when the terminal voltage reached the limited voltage measured about 6 CA. While in the prior art, the electric current at the same time point as above measured 2 to 3 CA that was relatively lower than the present invention. Therefore under the condition of DOD=30%, the charging capacity of the prior art resulted in ⅓ of that of the present invention.

Referring to FIG. 4, the charging capacity of the prior art likewise resulted in ⅓ of that of the present invention under the condition of DOD=50%.

As the above results show, the present invention provides the lead storage battery exhibiting high charging performance.

Embodiment 2

Referring to Table 1, such lead storage batteries as samples 1-1 to 1-3 containing VISP of the present invention, a comparative sample C1-1 containing lignin (using "VANILLEX N" manufactured by NIPPON PAPER INDUSTRIES CO., LTD. as the lignin) and a comparative sample C1-2 containing no VISP nor lignin were evaluated with respect to the performance, which is described as below.

Each of those samples 1-1 to 1-3, comparative samples C1-1 and C1-2 had the same structure as that of the embodiment 1. However each sample had a different type of the negative electrode additive and different amount thereof added to the porous lead oxide as the negative electrode active substance.

Each sample was tested for evaluating its performance.

An explanation of the capacity test is first described. Those samples 1-1 to 1-3, comparative samples C1-1 and C1-2 were discharged at 2.5 A to reach the terminal voltage at 1.65V. Then they were charged at 0.8 A to increase the voltage to 2.33V. They were continuously charged for 4 hours and kept at 30° C. for 6 hours.

The aforementioned process of discharging, charging and suspension is defined as 1 cycle.

Each of samples 1-1 to 1-3 and comparative samples C1-1 and C1-2 was subjected to 1 cycle process while keeping the temperature at 30° C. and the respective resultant capacities were measured. Each sample was subjected to 6 cycles and the respective resultant capacities were also measured.

The seventh cycle was executed by keeping the temperature of the lead storage battery at 0° C. and the resultant capacity after the seventh cycle was measured at 0° C. Then the temperature was increased to 30° C. again for executing the eighth cycle and the capacity after the eighth cycle was measured.

The measurement results are shown in Table 1.

As shown in Table 1, no particular difference in the capacity of each sample at 30° C. is observed. However at 0° C., the capacity of the C1-2 containing no VISP nor lignin was lower than those of the samples containing VISP 1-1 to 1-3 and comparative sample C1-1 containing lignin.

The samples 1-1 to 1-3 and comparative samples C1-1, C1-2 were subjected to discharging test both at 0° C. and 30° C., respectively.

In the test, each sample was adjusted to have the condition of DOD=50% and discharged with 150 A to measure the change with the elapse of time in the terminal voltage. A terminal voltage ($V_{10}$) after an elapse of 10 seconds from charging was multiplied by the discharging current. The multiplied value was further divided by the weight of the battery to obtain the specific power density. The calculation Therefore the lead storage battery represented by the samples 1-1 to 1-3 of the present invention exhibits identical discharging performance to that of the conventional lead storage battery represented by the comparative sample C1-1 (prior art) containing lignin as well as exhibiting more excellent charging performance than that of the sample C1-1.

It can be observed that the aforementioned characteristics become obvious as the temperature is further decreased.

TABLE 1

|  |  |  | Sample | | | Comparative sample | |
| --- | --- | --- | --- | --- | --- | --- | --- |
|  | Temp. | Unit | 1-1 | 1-2 | 1-3 | C1-1 | C1-2 |
| Composition |  |  |  |  |  |  |  |
| VISP | — | wt % | 0.3 | 0.3 | 0.6 | none | none |
| Lignin | — | wt % | none | none | none | 0.4 | none |
| Barium sulfate | — | wt % | 0.15 | 0.15 | 0.15 | 0.15 | 0.15 |
| Carbon | — | wt % | none | 0.15 | none | 0.15 | none |
| Capacity |  |  |  |  |  |  |  |
| 1 cycle | 30° C. | AH | 10.43 | 10.46 | 10.48 | 9.54 | 10.47 |
| 6 cycle | 30° C. | AH | 9.71 | 8.14 | 9.49 | 8.73 | 9.39 |
| 7 cycle | 0° C. | AH | 8.50 | 8.89 | 9.45 | 8.42 | 5.82 |
| 8 cycle | 30° C. | AH | 9.83 | 9.65 | 10.21 | 9.35 | 9.48 |
| Discharging |  |  |  |  |  |  |  |
| Specific power density | 30° C. | W/kg | 349 | 306 | 348 | 343 | 324 |
|  | 0° C. | W/kg | 217 | 219 | 235 | 226 | 164 |
| Charging |  |  |  |  |  |  |  |
| Regenerative specific power density | 30° C. | W/kg | 297 | 271 | 278 | 103 | 294 |
|  | 0° C. | W/kg | 157 | 169 | 162 | 82 | 127 | results are shown in Table 1. The measurement results are shown in Table 1.

According to the Table 1, the specific power density of each sample at 30° C. is hardly different from each other. However at 0° C., the specific power density of the comparative example C1-2 containing no negative electrode additive becomes lower than those of other samples.

The charging performance test was conducted with respect to the respective samples both at 0° C. and 30° C., respectively.

In the test, each sample was adjusted to have the condition of DOD=50% and charged with 150 A to measure the change with the passage of time in the terminal voltage. The terminal voltage ($V_{10}$) after an elapse of 10 seconds from charging was multiplied by the charging current. The multiplied value was further divided by the weight of the battery to obtain the regenerative specific power density. The calculation results are shown in Table 1.

Table 1 shows that at 30° C., the regenerative specific power density of the comparative sample C1-1 containing lignin is relatively low. While at 0° C., the regenerative specific power density of the comparative sample C1-2 containing no additive is slightly lower than those of samples 1-1 to 1-3. The comparative sample C1-1 containing lignin measured considerably lower regenerative specific power density than those of the samples 1-1 to 1-3 of the present invention by almost ½.

Embodiment 3

Figure 5:
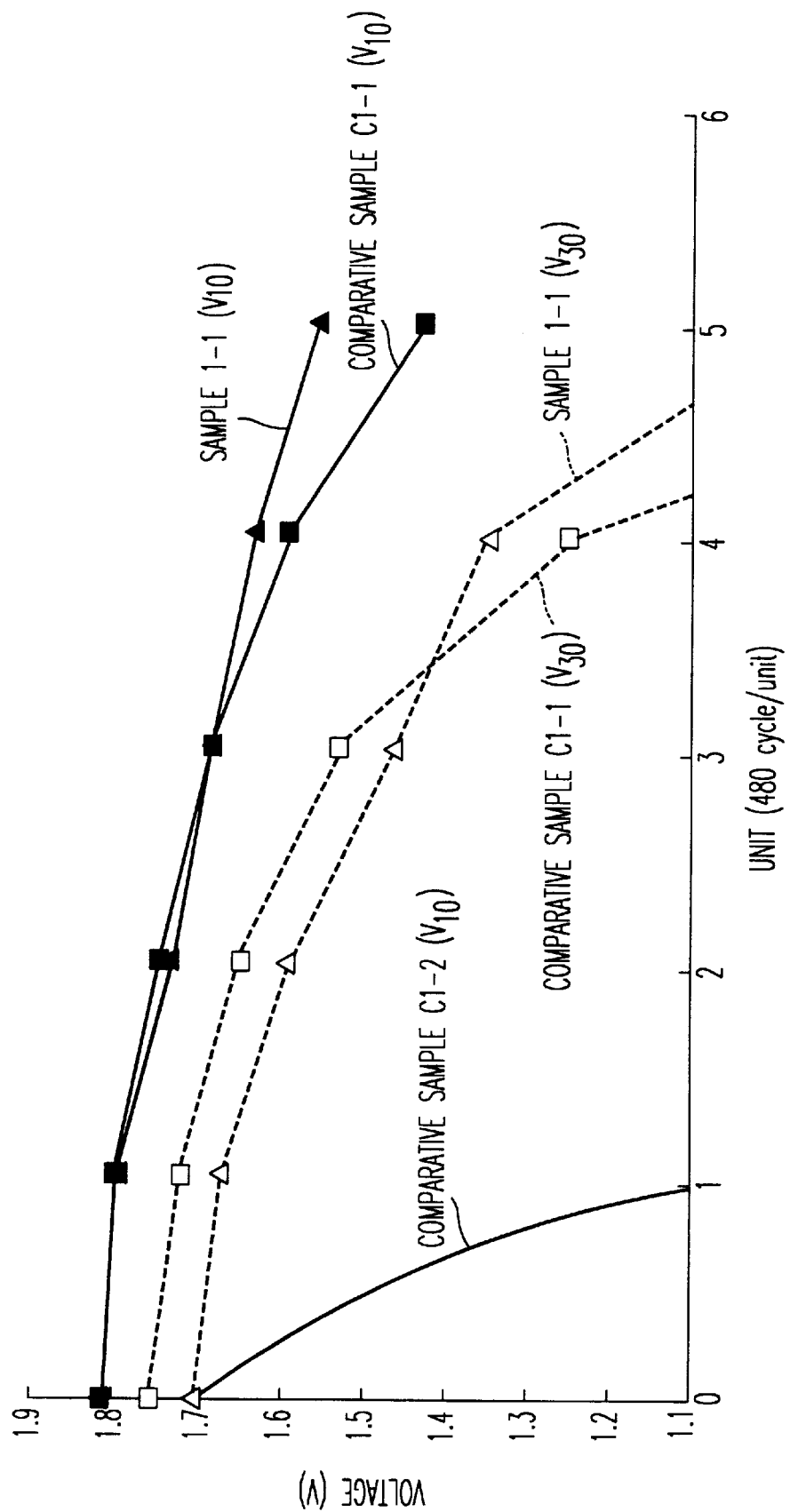
FIG. 5 is a graphical representation showing a relationship between a unit and a voltage with respect to the sample and the comparative sample measured based on SEA, respectively in an embodiment 3.

As shown in FIG. 5, the present invention and the prior art were subjected to the cycle life test. In this test, the sample 1-1 shown in Table 1 was used as the lead storage battery of the present invention and the comparative samples C1-1 and C1-2 shown in Table 1 were used as the prior art.

The cycle life test was conducted according to the following steps.

Based on SAE (quartering method, discharging current: 5A for 4 minutes; discharging voltage: 14.8V (2.47V/cell); and limiting current: 25 A for 10 minutes), 480 cycle/unit charging/discharging test was conducted at 40° C. Then $V_{10}$ (the terminal voltage after an elapse of 10 seconds from 150 A discharging the lead storage battery) and $V_{30}$ (the terminal voltage after an elapse of 30 seconds from 150 A discharging the lead storage battery) of each unit were measured with respect to the respective samples.

As for the comparative sample C1-2, only $V_{10}$ was measured.

The measurement results are visualized as shown in FIG. 5.

As FIG. 5 shows, the terminal voltage of the sample 1-1 is almost the same as that of the comparative sample C1-1 in case of the same number of charging/discharging unit (480 cycle). Therefore it is obvious that the cycle life of the sample 1-1 is the same as that of the C1-1.

This shows that similar to the lignin, the VISP hardly gives a great influence on the charging/discharging cycle life of the lead storage battery.

The cycle life of the comparative sample C1-2 containing no VISP nor lignin is considerably shorter than those of the sample 1-1 and the comparative sample C1-1 (FIG. 5).

Embodiment 4

Figure 6:
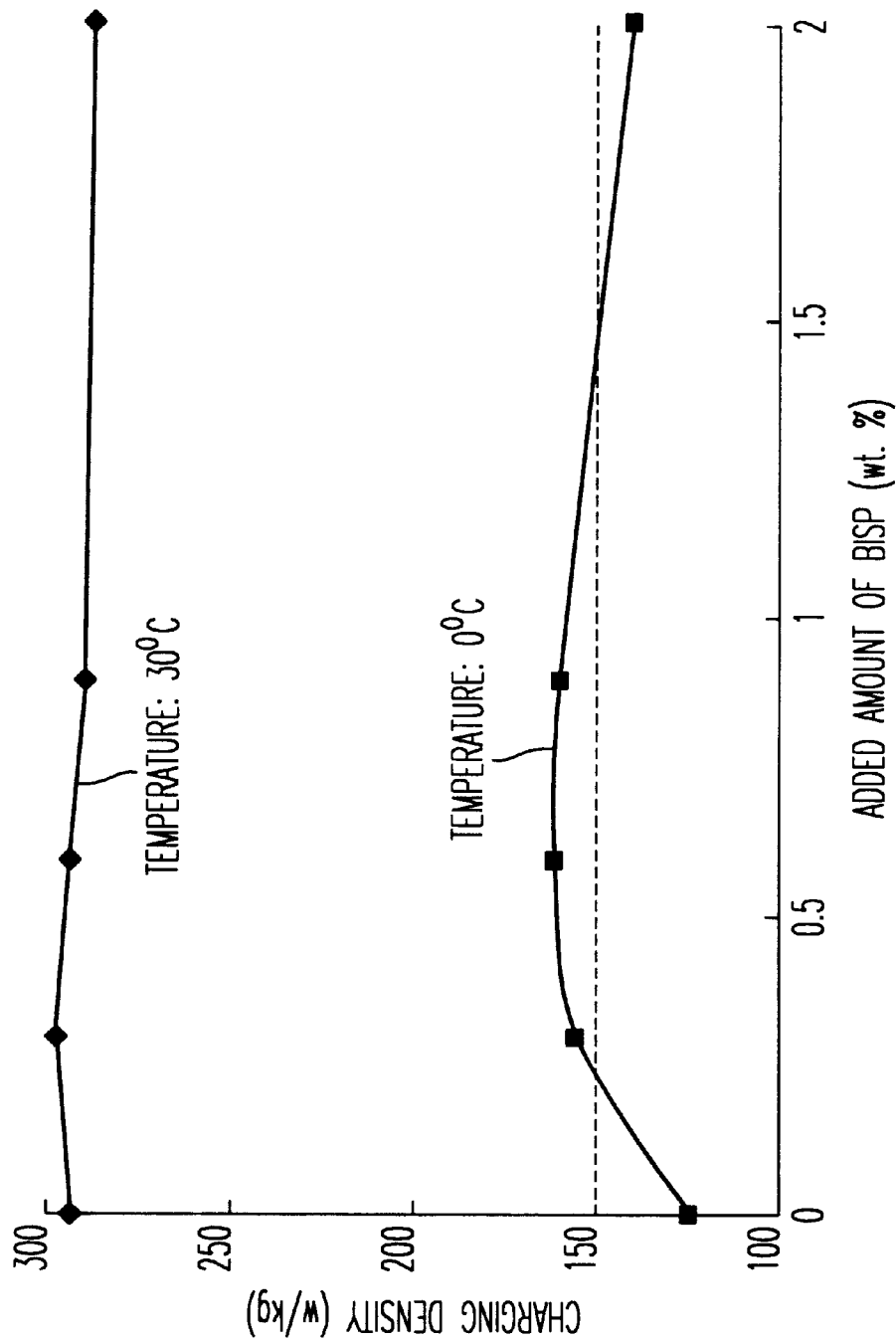
FIG. 6 is a graphical representation showing a relationship between the added amount of VISP and the regenerative specific power density at 30° C. and 0° C., respectively in an embodiment 4.
Figure 1:
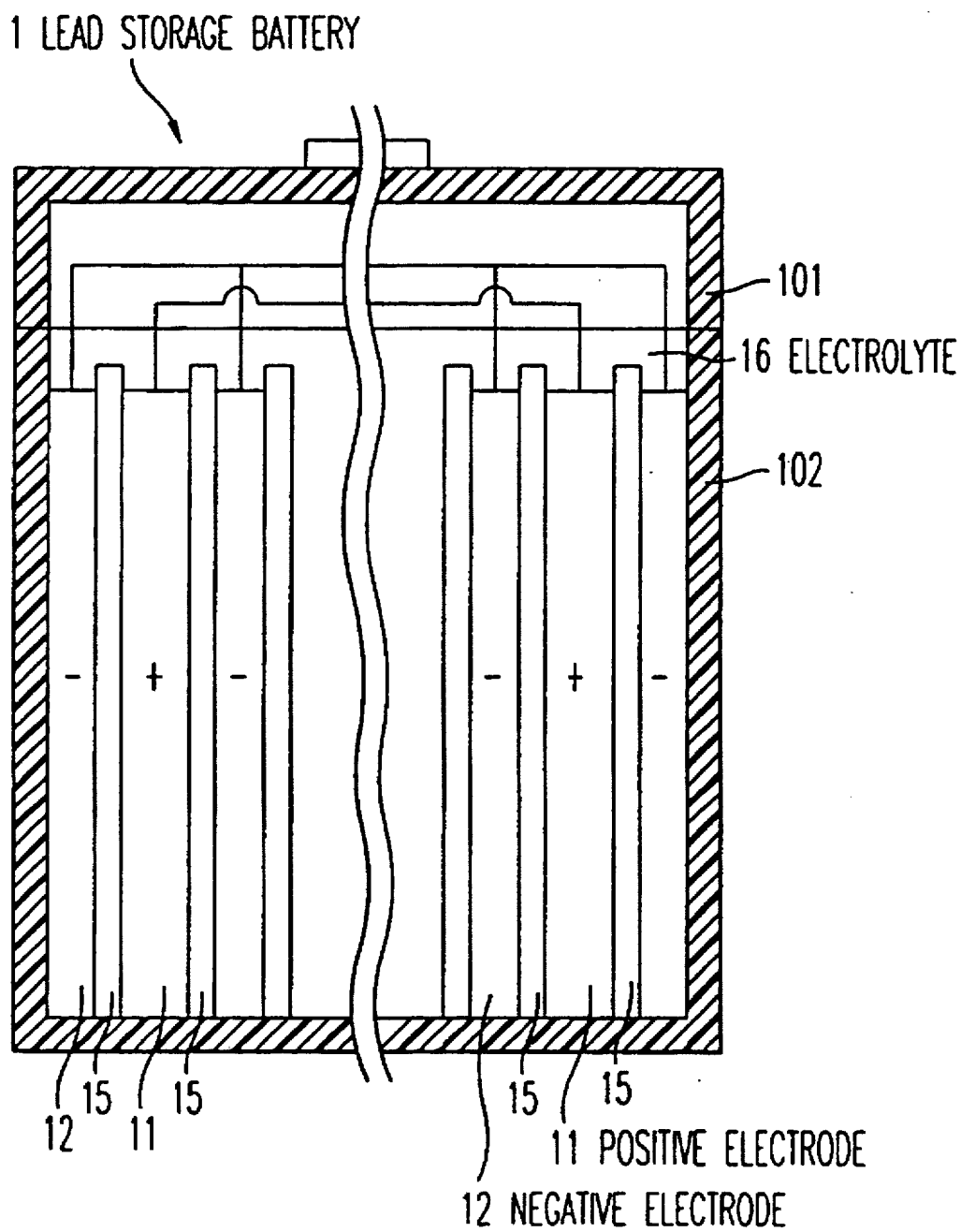
Figure 2:
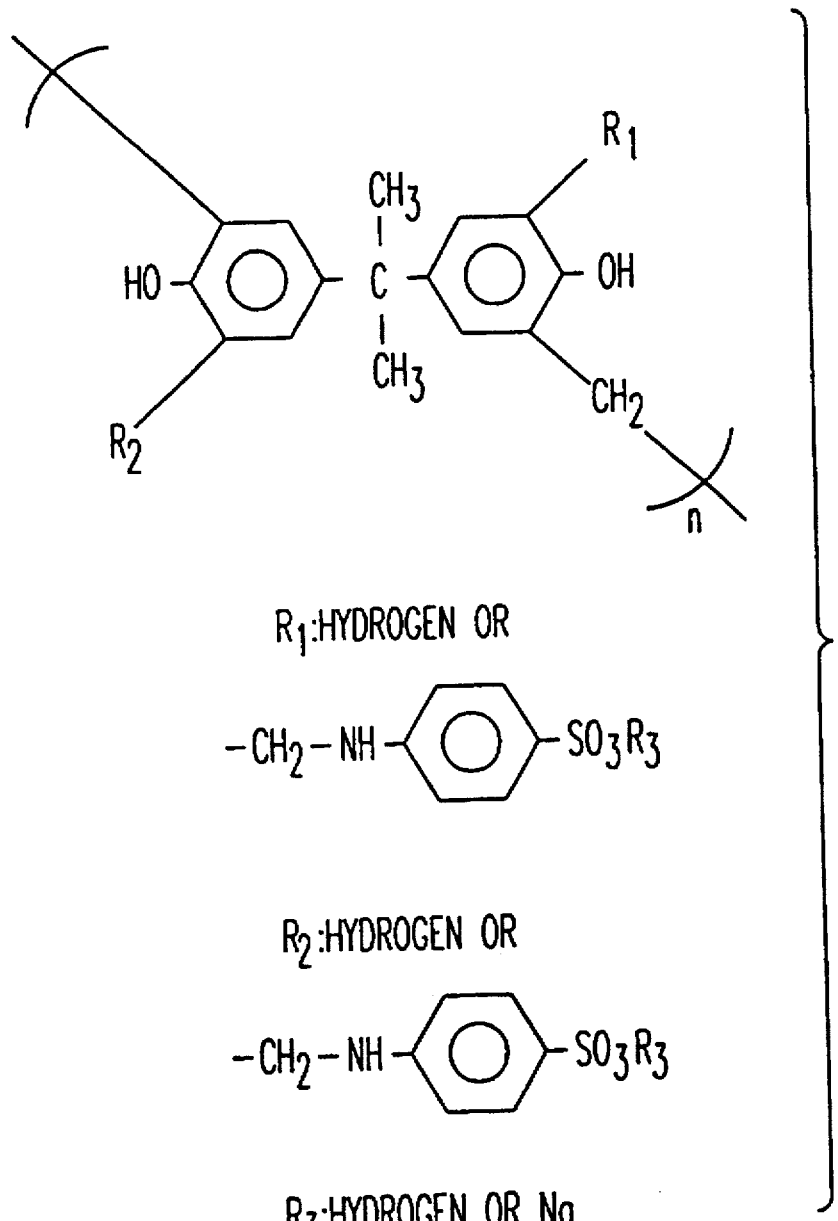
Figure 4:
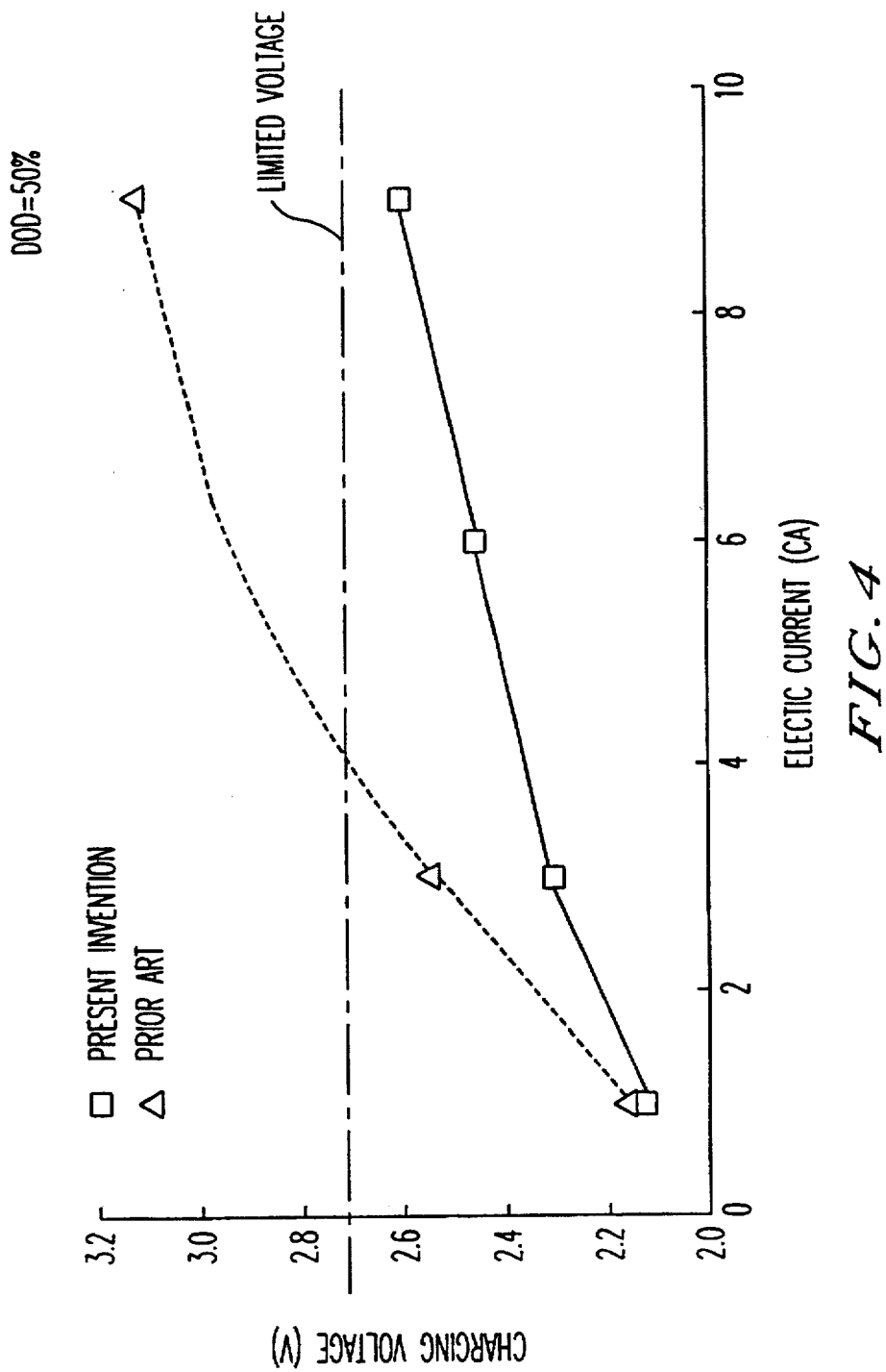

In this embodiment, a relationship between the amount of the VISP added to 100 wt. % of the lead oxide and the resultant regenerative specific power density was measured as shown in FIG. 6.

The lead storage battery used for the measurement is identical to the sample 1-1 shown in Table 1 except the added amount of the VISP. The regenerative specific power density was measured in the same manner as aforementioned at 30° C. and 0° C., respectively.

The measurement results are visualized as shown in FIG. 6.

According to FIG. 6, at 30° C., the regenerative specific power density was not sharply decreased by the change of the added amount of the VISP in the above measurement range. However at 0° C., the regenerative specific power density obviously decreased in both cases that the added amount of the VISP was too small and too large. Therefore in case the lead storage battery of the present invention is used in the cold district, it is assumed that 0.2 wt. % or more amount of the VISP has to be added. It is preferable to set the upper limit of the amount of the VISP to 1.5 wt. % added to the lead storage battery that is expected to be used in the cold environment such as a large refrigerator, the north pole, the south pole or at the low temperature.

Embodiment 5

Referring to Tables 2 and 3, each performance of VISP-contained samples 2-1 to 2-4 of the present invention and comparative samples C2-1, C2-2 is described.

The structure of each of those samples 2-1 to 2-4 and comparative samples C2-1, C2-2 is the same as that of the lead storage battery of embodiment 1. However, each sample used different type of the negative electrode additive added to the porous lead oxide as the negative electrode active substance.

Each sample is hereinafter described.

The samples 2-1 to 2-3 used the bisphenol A·aminobenzene sulfonic acid·formaldehyde condensate as the negative electrode additive.

The sample 2-4 used bisphenol S·aminobenzene sulfonic acid·formaldehyde condensate as the negative electrode additive.

Each of the negative electrode additives used in the samples 2-1 to 2-4 has a different sulfur content, respectively as shown in Table 3. The sulfur content was derived from ICP (Ion Sequential Plasma) method as the solid part (weight) ratio of the sulfur to the solid part of the condensate.

The samples containing the VISP 2-1 to 2-4 were produced at the reaction molar ratio shown in Table 2 based on the method described in JP 1910968 and U.S. Pat. No. 5,153,299. In Table 2, each reaction molar ratio of the bisphenol A and the bisphenol S is equivalent to 1.0 mole as the phenol core.

The samples 2-1 to 2-4 were formed as the sodium salt neutralized by using 1 mole of sodium hydroxide to 1 mole of the aminobenzene sulfonic acid.

TABLE 2

| | Sample | | | |
|---|---|---|---|---|
| | 2-1 | 2-2 | 2-3 | 2-4 |
| Bisphenol A | 0.5 | 0.5 | 0.5 | — |
| Bisphenol S | — | — | — | 0.5 |
| Aminobenzene sulfonic acid | 0.37 | 0.5 | 1.0 | 1.0 |
| Formaldehyde | 1.1 | 1.3 | 1.8 | 1.8 |

The lead storage battery using naphthalenesulfonic acid·formaldehyde condensate (Product name: Vaniall HD100, manufactured by NIPPON PAPER INDUSTRIES CO., LTD.) as the negative electrode additive was used as the comparative sample C2-1.

The lead storage battery using ligninsulfonic acid (Product name: Vanilex N, manufactured by NIPPON PAPER INDUSTRIES CO., LTD.) as the negative electrode additive was used as the comparative sample C2-2.

The above lead storage batteries as the respective samples were subjected to the test in the following manner.

Capacity cycle (charging, discharging, suspension after charging) was repeated at an ambient temperature for stabilizing the capacity. Then each capacity of the lead storage batteries as the respective samples was measured at 0° C. The measurement results are shown in the column titled "Capacity" in Table 3.

In Table 3, the mark ○ represents that the capacity of the sample is equivalent to that of the sample 2-3 as the reference (90 to 110%). The mark Δ represents that the capacity of the sample is 90% or less of the reference capacity of the sample 2-3.

The electric current ranging from 1 to 10 CA was discharged with respect to each sample so that the respective terminal voltages were measured, forming I (current)–V (voltage) plot. The discharging (W)=current (A)×voltage (V) was derived from the plot. The obtained result is shown in the column titled "Discharging" in Table 2.

In Table 2, the mark ○ represents that the output of the sample is equivalent to that of the sample 2-3 (90 to 110%) as the reference. The mark Δ represents that the output of the sample is 90% or less of the reference output of the sample 2-3.

The electric current ranging from 1 to 10 CA was charged with respect to each sample so that the respective terminal voltages were measured, forming I (current)–V (voltage) plot. The charging (W)=current (A)×voltage (V) was derived from the plot. The obtained result is shown in the column titled "Charging" in Table 3.

In Table 3, the mark ⊙ represents that the charging level of the sample is 120% or more than that of the sample 2-3 as the reference level. The mark ○ represents that the charging level of the sample is equivalent to the reference level of the sample 2-3 (90–110%). The mark Δ represents that the charging level of the sample is 90% or less than the reference level of the sample 2-3. The mark X represents that the charging level of the sample is 70% or less than the reference level of the sample 2-3.

As test results show, the lead storage battery of the present invention to which the negative electrode additive has been added provides the same performance as that of the conventional lignin-added lead storage battery in a low temperature range without degrading its capacity and output as well as having excellent charging performance.

In case of a low sulfur content of the negative electrode additive especially by 5% or less, excellent charging ability can be obtained. However its capacity and output performances were degraded.

In case of high sulfur content of the negative electrode additive especially by 13% or more, the charging ability was degraded but capacity and output performances were improved.

As described above, it is obvious that using condensate having the appropriate sulfur content ranging from 6 to 11% as the negative electrode additive allows for further excellent lead storage battery.

TABLE 3

|  | Sulfur content | Capacity | Output | Charging |
|---|---|---|---|---|
| Sample |  |  |  |  |
| 2-1 | 5 | Δ | Δ | ⊚ |
| 2-2 | 7 | ○ | ○ | ⊚ |
| 2-3 | 10 | — | — | — |
| 2-4 | 13 | ○ | ○ | Δ |
| Comparative Sample |  |  |  |  |
| C2-1 | — | ○ | ○ | Δ |
| C2-2 | — | ○ | ○ | X |

Application to the Industrial Field

The present invention provides the lead storage battery having a prolonged cycle life and excellent charging performance.

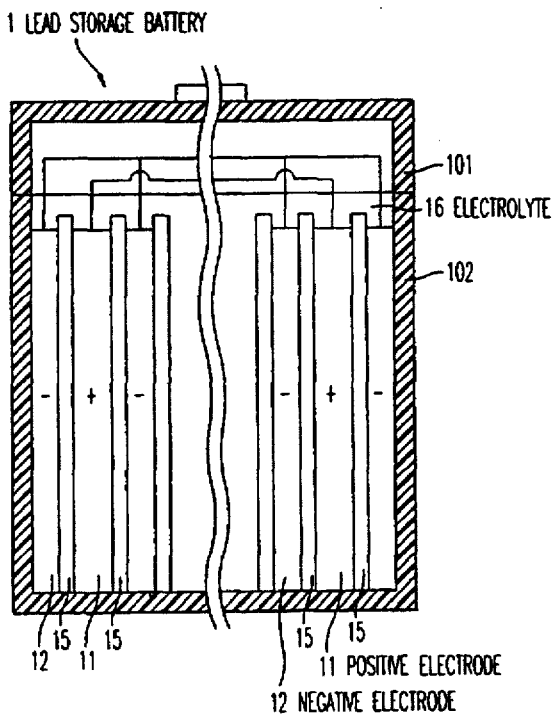

What is claimed is:

1. A lead storage battery comprising a positive electrode and a negative electrode, wherein said negative electrode contains a negative electrode active substance to which a negative electrode additive is added and said negative electrode additive is a phenol·aminobenzene sulfonic acid·formaldehyde condensate.

2. The lead storage battery according to claim 1, wherein a sulfur content of said phenol·aminobenzene sulfonic acid·formaldehyde condensate ranges from 6 to 11%.

3. The lead storage battery according to claim 1, wherein said phenol·aminobenzene sulfonic acid·formaldehyde condensate is a bispheno·aminobenzene sulfonic acid·formaldehyde condensate.

4. The lead storage battery according to claim 1, wherein said phenol·aminobenzene sulfonic acid·formaldehyde condensate is a bisphenol A·aminobenzene sulfonic acid·formaldehyde condensate.

5. The lead storage battery according to claim 4, wherein 0.2 wt. % or more of said bisphenol A·aminobenzene sulfonic acid·formaldehyde condensate is added to said negative electrode active substance.

6. The lead storage battery according to claim 4, wherein said negative electrode active substance contains barium sulfate.

7. The lead storage battery according to claim 4, wherein said bisphenol A·aminobenzene sulfonic acid·formaldehyde condensate comprises a sodium salt of an aminobenzene sulfonic acid group.

8. The lead storage battery according to claim 1, wherein said phenol·aminobenzene sulfonic acid·formaldehyde condensate is a bisphenol F·aminobenzene sulfonic acid·formaldehyde condensate.

9. The lead storage battery according to claim 1, wherein said phenol·aminobenzene sulfonic acid·formaldehyde condensate is a bisphenol S·aminobenzene sulfonic acid·formaldehyde condensate.

10. A process for making a lead storage battery, the process comprising forming the lead storage battery of claim 1.

11. A process for using a lead storage battery, the process comprising at least one of charging and discharging the lead storage battery of claim 1.

* * * * *

UNITED STATES PATENT AND TRADEMARK OFFICE
CERTIFICATE OF CORRECTION

PATENT NO.   : 6,074,782
DATED        : June 13, 2000
INVENTOR(S)  : Mizutani et al.

It is certified that error appears in the above-identified patent and that said Letters Patent is hereby corrected as shown below:

The title page showing as illustrative figure should be deleted and substitute therein the atached title page.

<u>Drawings</u>,
Sheet 1 of 6, delete FIG. 1 in its entirety, and substitute therefor the attached FIG. 1.
Sheet 2 of 6, delete FIG. 2 in its entirety, and substitute therefor the attached FIG. 2.
Sheet 4 of 6, delete FIG. 4 in its entirety, and substitute therefor the attached FIG. 4.

Signed and Sealed this

Eighth Day of January, 2002

Attest:

Attesting Officer

JAMES E. ROGAN
*Director of the United States Patent and Trademark Office*

United States Patent [19]
Mizutani et al.

[11] Patent Number: 6,074,782
[45] Date of Patent: Jun. 13, 2000

[54] LEAD STORAGE BATTERY CONTAINING A NEGATIVE ELECTRODE ACTIVE SUBSTANCE INCLUDING A NEGATIVE ELECTRODE ADDITIVE

[75] Inventors: Muneharu Mizutani, Toyohashi; Katsumi Yamada, Nishio; Takaki Kamio, Kariya; Masanobu Kawamura, Iwakuni, all of Japan

[73] Assignees: Aisin Seiki Kabushiki Kaisha, Kariya; Nippon Paper Industries Co., Ltd., Tokyo, both of Japan

[21] Appl. No.: 08/952,510
[22] PCT Filed: Mar. 27, 1997
[86] PCT No.: PCT/JP97/01066
§ 371 Date: Dec. 23, 1997
§ 102(e) Date: Dec. 23, 1997
[87] PCT Pub. No.: WO97/37393
PCT Pub. Date: Oct. 9, 1997

[30] Foreign Application Priority Data

Mar. 29, 1996 [JP] Japan ................................. 8-103757

[51] Int. Cl.[7] ................................................ H01M 4/60
[52] U.S. Cl. ............................................ 429/215; 429/227
[58] Field of Search ..................................... 429/215, 227

[56] References Cited

FOREIGN PATENT DOCUMENTS 2-234352   9/1990   Japan.
7-90193    4/1995   Japan.
8-245899   9/1996   Japan.

OTHER PUBLICATIONS

GS News, vol. 37, No. 1, pp. 22–28, 1978. Effect of Lignin Additive in Negative Electrode for Lead–Acid Battery.

*Primary Examiner*—Maria Nuzzolillo
*Assistant Examiner*—Laura Weiner
*Attorney, Agent, or Firm*—Oblon, Spivak, McClelland, Maier & Neustadt, P.C.

[57] ABSTRACT

A lead storage battery comprising a positive electrode 11 and a negative electrode 12. The negative electrode 12 contains a negative electrode active substance to which a negative electrode additive is added. The negative electrode additive is a phenol-aminobenzene sulfonic acid-formaldehyde condensate. The above-structured lead storage battery provides a prolonged cycle life and excellent charging performance.

11 Claims, 6 Drawing Sheets